(12) United States Patent
Neyman et al.

(10) Patent No.: US 9,355,465 B2
(45) Date of Patent: May 31, 2016

(54) DYNAMIC PROGRAMMABLE TEXTURE SAMPLER FOR FLEXIBLE FILTERING OF GRAPHICAL TEXTURE DATA

(71) Applicants: Aleksander Olek Neyman, Gdansk (PM); Michael Apodaca, Folsom, CA (US)

(72) Inventors: Aleksander Olek Neyman, Gdansk (PM); Michael Apodaca, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 223 days.

(21) Appl. No.: 14/142,539

(22) Filed: Dec. 27, 2013

(65) Prior Publication Data

US 2015/0187089 A1    Jul. 2, 2015

(51) Int. Cl.
*G06T 7/40*    (2006.01)
*G06T 11/40*    (2006.01)

(52) U.S. Cl.
CPC ............... *G06T 7/403* (2013.01); *G06T 11/40* (2013.01)

(58) Field of Classification Search
CPC ............. G06T 1/60; G06T 7/40; G06T 15/04; G06F 9/50
See application file for complete search history.

(56) References Cited

U.S. PATENT DOCUMENTS

| 6,919,904 B1 * | 7/2005 | Kilgariff | G06T 15/04 345/426 |
| 2003/0142099 A1 * | 7/2003 | Deering | G09G 5/391 345/531 |

* cited by examiner

*Primary Examiner* — Antonio A Caschera
(74) *Attorney, Agent, or Firm* — Lynch Law Patent Group, P.C.

(57) ABSTRACT

For a given texture address, a multi-mode texture sampler fetches and reduces texture data with a multi-mode filter accumulator suitable for providing a weighted average over a variety of filter footprints. A multi-mode texture sampler is configurable to provide both a wide variety of footprints and allow for a filter footprint significantly wider than the bi-linear (2×2 texel) footprint. In embodiments, filter coefficients specifying a weighting for each texel in a flexible footprint are cached from coefficient tables stored in memory. Techniques and systems are provided for dynamic allocation, update and handling of weighting coefficient tables as resources independent of sampler state.

21 Claims, 12 Drawing Sheets

DYNAMIC PROGRAMMABLE TEXTURE SAMPLER FOR FLEXIBLE FILTERING OF GRAPHICAL TEXTURE DATA

TECHNICAL FIELD

Embodiments of the invention generally relate to computer graphics, and more particularly relate to sampling and filtering of texture data.

BACKGROUND

Graphics rendering, particularly for three dimensional (3D) graphics applications, is one of the most processing intensive activities performed by personal computers. Graphics co-processors are available on most modern day personal computers. FIG. 1A, is a system 100 employing a graphics processor 101 and a central processor 102, each coupled to a system memory 103 (e.g., DRAM, eDRAM, etc.) by a bus. Central processor 102 and graphics processor 101 may be disposed on a single piece of silicon (i.e., a single-chip solution), or integrated at a package, board, or system level. Graphics processor 101 includes a plurality of parallel processing sub-systems, or slices 105. Each slice 105 may be replicated any number of times for greater parallel graphics processing power. Within slice 105, there are a number of execution units (EU) 110, also known as "shader cores," or simply "cores." Each EU 110 contains scalar integer and floating-point arithmetic units that execute instructions and may for example execute a shader program. Each EU 110 has an instruction set architecture (ISA), may support context switching and pre-emptive multi-tasking, and may be essentially a complete x86 core, for example. Along with EUs 110, slice 105 includes a level two (L2) cache 130 (e.g., SRAM, eDRAM, etc.) and texture sampler 120. Texture sampler 120 includes fixed function logic (e.g., state machines). Texture sampler 120 may communicate with EU 110 via cache 130. Cache 130 may function as a texture cache that is a read-only memory to texture sampler 120 holding large arrays of predetermined texture data for use in texture mapping when a graphic is rendered for display by a platform hosting system 100.

The transformation of scene information (source data) into displayable images requires a number of functionalities, referred to in aggregate as a 3D graphics rendering pipeline. FIG. 1B is flow diagram depicting certain operations particular to a texture mapping portion of the graphics rendering pipeline. Texture mapping 101 generally entails imaging a textured signal onto a primitive's geometry, for example giving the appearance of pixel-level detail on more coarsely rendered polygon meshes that are manipulated on a vertex basis. At operation 105, texture coordinates are assigned to vertices of a given polygon. Generally, a texture is a digital image comprising an array of texels (texture elements), which may be individually addressed based on location within a two-dimensional (u,v) coordinate space, or in a three-dimensional (u,v,s) coordinate space. In the (u,v) coordinate space, u is the width and v is the height, and may be mapped between 0 and 1 based on the texture width and height. At operation 107 the texture coordinates are interpolated at each pixel within the polygon vertices. At operation 111, a texture color for each pixel is fetched into cache based on the interpolated texture coordinate. At operation 113, the texture is sampled and filtered to arrive at a particular texel color at each pixel. Often, there is a disparity between a number of sample texture elements (texels) and the source texture image and the number of picture elements (pixels) to which the image is mapped. If a texture is too large or too small for a given polygon, the texture is filtered to fit the space. A magnification filter enlarges (zooms-in) a texture, a minification filter reduces (zooms-out) the texture to fit into a smaller area. Texture magnification maps few texels to many pixels by repeating the sampled texel for a plurality of addresses, for example providing a blurrier image. Texture minification maps many texels to few pixels by combining more than one texel value into a single value. This can cause aliasing or jagged edges, and antialiasing techniques become important to reduce visual artifacts. The goal of texture filtering then is to compute the average value of the image over an area around each pixel, for example through averaging of many texels associated with a given pixel.

Texture filtering has largely been performed by fixed-function logic found in texture sampler 120. Such texture samplers have a fixed filter footprint (shape) associated with a type of texture filtering, such as point sampling, bi-linear filtering, tri-linear filtering, and anisotropic filtering. As the filtering methods become increasingly complex, and as uses for texture data continues to expand (e.g., used for lighting and other surface properties in addition to color), a sampler with a fixed-function filter has become inefficient and/or insufficient. As such, shader programs (e.g., executed by EU 110) have taken larger roles in texture mapping, for example resulting in the architecture of system 106 illustrated in FIG. 1C. In system 106, EU 110 implements a filter footprint 140 in an application layer, and a plurality of texture requests in (u,v) space associated with footprint 140 are sent to the texture sampler 120. Texture sampler 120 then fetches texture data 115 into the cache for each of the (u,v) addresses associated with filter footprint 140. EU 110 executing instructions defined in the application layer then accumulates texture data 115. As such, texture data for an entire footprint is passed through the texture sampler with no data reduction because filtering is off-loaded from fixed-function logic 131 onto EU 110. In this configuration however, sampler chip area occupied by fixed-function logic 131 is wasted. Furthermore, texture mapping bandwidth is potentially constrained with the greater amount of data communicated between EU 110 and texture sampler 120 since texture data is not significantly processed and/or reduced by texture sampler 120. Another disadvantage of the system architecture depicted in FIG. 1C is that filtering performed by EU 110 may require more power and may be slower than if implemented with optimized, purpose-built logic circuitry within texture sampler 120. Therefore, the programmability afforded with shader-based filtering may be particularly disadvantageous for mobile devices executing graphics-intensive applications where the greater power demand translates into reduced battery life.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1A:
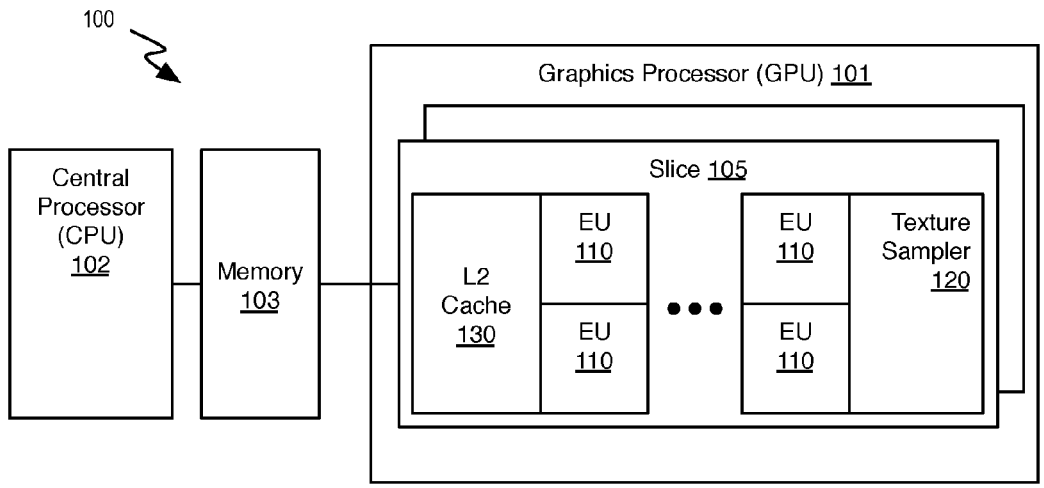
FIG. 1A, is a conventional system architecture including a central processor and a graphics processor.
Figure 1B:
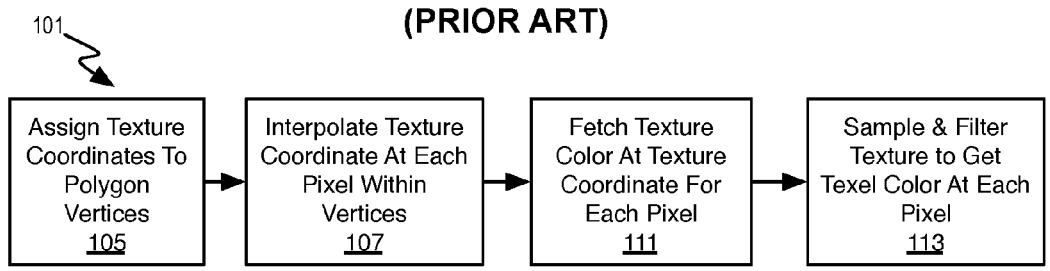
FIG. 1B is flow diagram depicting particular texture mapping operations in a typical graphics rendering pipeline within a graphics processor.
Figure 1C:
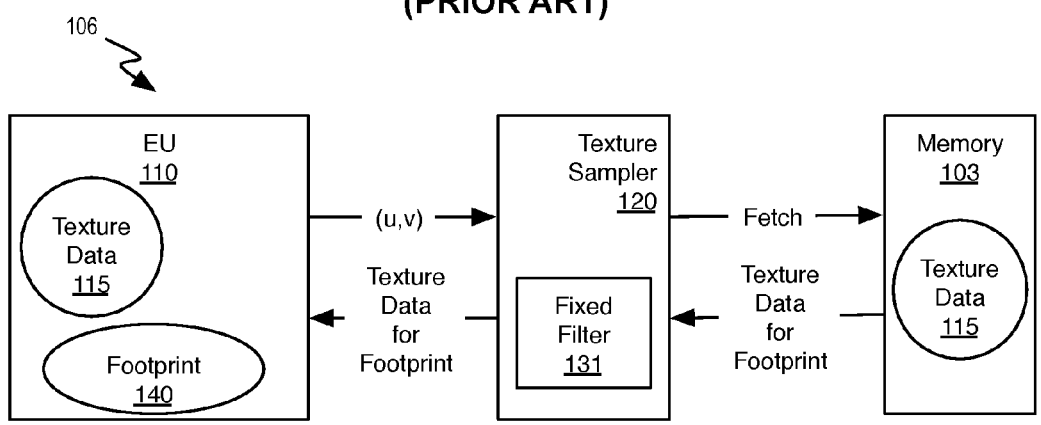
FIG. 1C is a conventional graphics processor architecture employing a shader for texture filtering.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that the present invention may be practiced without these specific details. Well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used in throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B, and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For example, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, firmware, software, or any combination thereof. At least some of the material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Systems, articles, and methods are provided below for binding weighting coefficient tables as resources to certain slots of a shader program independent of the textures and samplers bound to the shader to reduce and/or minimize sampler state changes which would occur if the weighting coefficients employed in a particular flexible filter state were bound as part of a sampler resource.

Figure 1D:
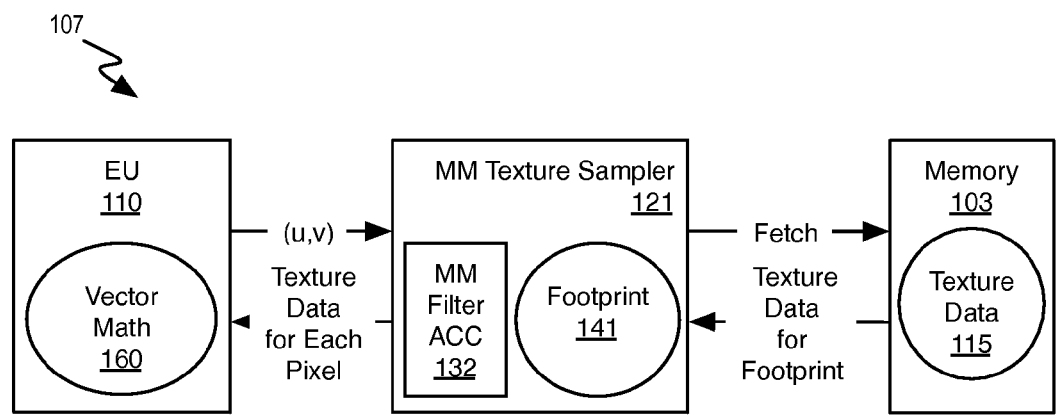
FIG. 1D is a graphics processor architecture employing a multi-mode texture sampler, in accordance with one or more embodiment.

The systems, articles, and methods described below may be implemented with a multi-mode texture sampler capable of flexible filtering operations providing a high performance and low power solution for 2D and 3D visual computing applications. Certain attributes of an exemplary multi-mode (MM) sampler with a flexible filter in accordance with embodiments herein are depicted in FIG. 1D. As shown, EU 110 is to perform vector math 160, higher-level rendering algorithms, and memory writes, etc. When texture mapping is needed, a texture address (u,v) is communicated to a multi-mode (MM) texture sampler 121. For a given texture address, MM texture sampler 121 is to fetch texture data 115 for a variety of user-definable footprints 141, and reduce texture data 115 by processing with MM filter accumulator 132. MM filter accumulator 132 is suitable for providing output values corresponding to a weighted average over the variety of filter footprints 141. MM texture sampler 115 returns to the EU 110 reduced data corresponding a sampled, filtered pixel color (R/G/B) for each pixel. Unlike a fixed-function texture sampler therefore, MM texture sampler 121 is configurable to accommodate both a wide variety of footprints and allow for a footprint to be significantly wider than the bi-linear (2×2 texel) footprint often employed in fixed-function minification filtering. The MM texture sampler 121 can require less power and reduced EU-to-sampler communication while still providing the greater level functionality, such as lighting/shadowing effects, heretofore available only through shader-based filters.

Figure 2:
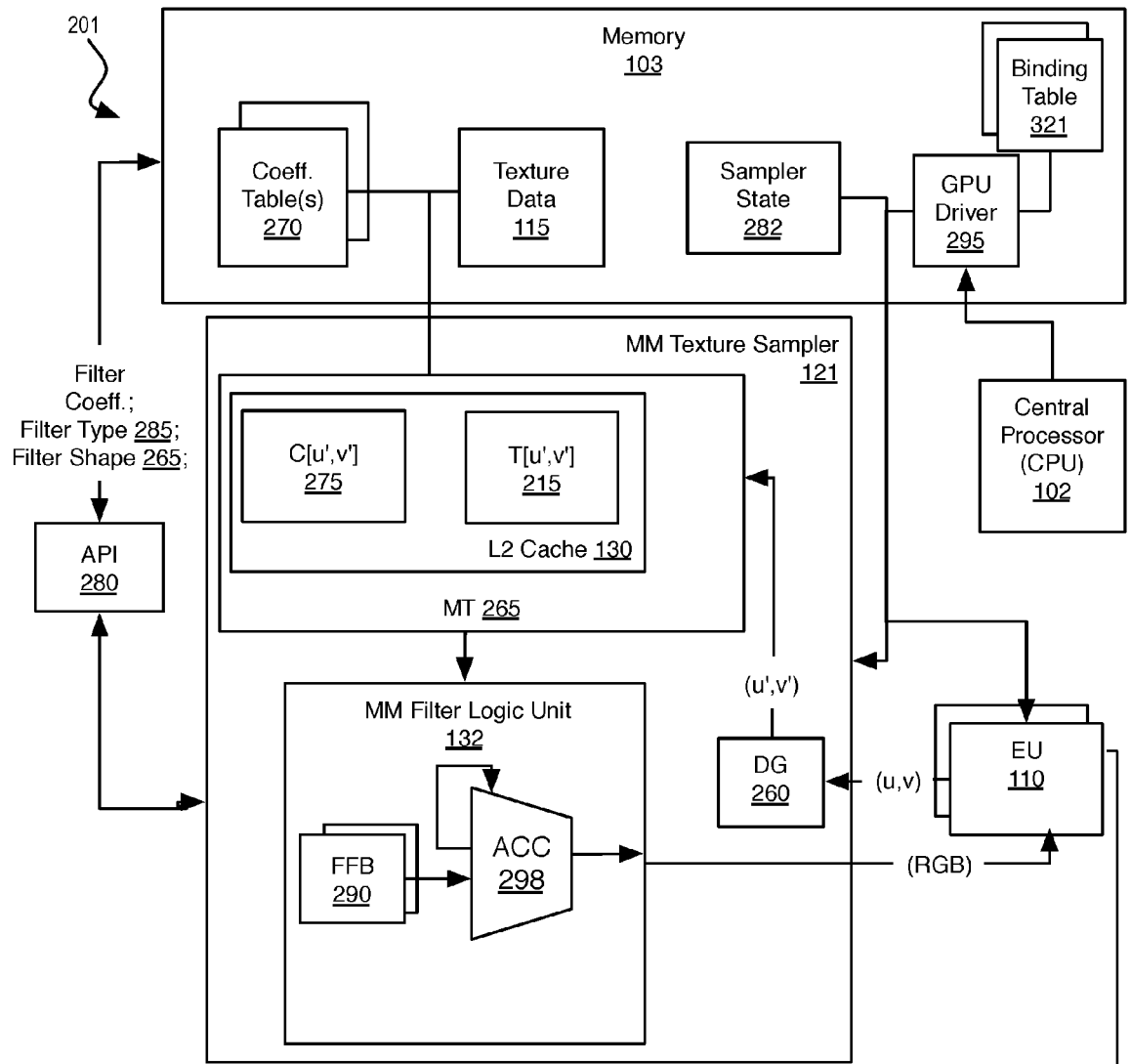
FIG. 2 is a functional block diagram further illustrating a system including a host computer and a graphics processor with a multi-mode flexible texture sampler, in accordance with one or more embodiments.

FIG. 2 is a functional block diagram further illustrating a system 201 including a graphics processor employing multi-mode flexible texture sampler 121, in accordance with an embodiment. System 201 includes one or more EU 110 communicatively coupled to MM texture sampler 121. EU 110 is to provide for each pixel an input texture address or coordinate, for example in (u,v) space, to MM texture sampler 121. While two dimensional texture addresses are employed in the description herein, it is noted that the techniques and hardware described herein may be adapted to greater dimensionality (e.g., 3D) by one of ordinary skill. MM sampler 121 includes a logic circuitry represented as data generator (DG) 260, which is to generate texel sampling addresses (i.e. sub-samples) based on the input texture address and a based further on a desired filter footprint. The sub-sample addresses (u',v') generated by DG 260 identify one or more texel sub-sampling position for a predetermined bounding region within which a footprint is defined. Sub-sampling addresses (u',v') are sequenced and passed to multi-thread (MT) unit 265, which is to fetch data into cache 130 and handle overhead associated with the cache FIFO (e.g., locality-based fetching, latency, cache misses, etc.). In embodiments herein, MT unit 265 caches texel data T[u',v'] 215 associated with each sub-sample address. Whereas a conventional fixed function sampler may be called upon to dynamically calculate filter coefficients for an input texture address, for example through a bi-linear interpolation algorithm, MT unit 265 further caches predetermined filter (weighting) coefficients 275 associated with each (u',v') sub-sample address (i.e., C[u',v']). Filter coefficients 275 are an additional input to MM texture sampler 121. Filter coefficients 275 may be stored in memory 103, entered for example as one or more coefficient tables 270 through API 280. API 280 may be implemented for example as a set of extensions to an existing graphics processor API, such as, but not limited, to DirectX and OpenGL. API 280 exposes coefficient tables 270 to an application layer and may allow the tables to be populated with predetermined values appropriate for a given filter. As one example, an application layer routine that evaluates a Gaussian blur function may be executed to automatically generate coefficients values stored in coefficient tables 270. Fixed memory allocations for storing values in coefficient table(s) 270 may be made based on the size of the predetermined bounding region within which a footprint is defined, as well as the mode of the MM texture sampler.

In embodiments, MM texture sampler 121 is selectively operable in both a separable filter mode and a non-separable filter mode for any of a plurality of programmable filter footprints. In the exemplary embodiment, the non-separable filter mode implements the filter function, $$= \sum_{=0} \sum_{=0}$$

where $C_{xy}$ is the filter coefficient for a given sampled address (u',v') and $T_{xy}$ is the texel (color) value for the given sampled address (u',v'). The weighting is generally performed over the entire bounding region, m, which is predetermined to be some fixed size sufficient to implement all desired footprints. In one exemplary embodiment, m=7, allowing for up to an 8×8 texel footprint to be defined. For such embodiments, coefficient table 270 includes one coefficient for each texel within the bounding region m. MM texture sampler 121 is further operable in a separable filter mode. In one exemplary embodiment, the separable filter mode implements the filter function:

$$= \sum_{=0}^{h-1} \sum_{=0}^{-1} ,,$$

where $H_{A,x}$ is a horizontal filter coefficient, $V_{B,y}$ is a vertical filter coefficient for a given filter width w and height h defined within the predetermined bounding region. As for non-separable coefficient $C_{x,y}$, values of separable coefficients $H_{A,x}$ and $V_{B,y}$ may be stored in coefficient table(s) 270 as source data for cache fetches. While both the separable and non-separable filter modes are further described below in the context of the above exemplary filter functions, it is noted one of ordinary skill in the art may adapt the architecture and techniques described herein to another non-separable and/or separable filter function.

In embodiments, API 280 further exposes sampler state 282 that specifies the mode in which MM texture sampler 121 is to operate. For example, a state value may specify a legacy mode or flexible filter mode, a non-separable or separable flexible filter mode, etc. In further embodiments, API 280 may additionally expose a sampling bit mask, which DG 260 may utilize the filter shape ID 265 to efficiently generate contributing sub-sample addresses (i.e., those addresses within the predetermined bounding region having non-zero filter coefficients).

As further illustrated in FIG. 2, MM texture sampler 121 includes MM filter logic (FL) unit 132, which performs filtering and returns a color value (e.g., R/B/G, R/B/G/A, etc.) for each pixel based on the filter mode, filter footprint, texel values, and filter coefficient values. This returned value may then be utilized in output pipeline 198 and output to display 199, or utilized in a hidden layer calculation, etc. MM FL 132 includes flexible filter block (FFB) 290 having logic circuitry to perform filtering over any flexible footprint provided in either separable or non-separable filter modes. MM FL 132 further includes accumulator 298 that is to accumulate a plurality of flexible filter block outputs to generate a weighted average over a given flexible filter footprint. MM FL 132 may further include a divider (not depicted) to normalize output from FFB 290 or accumulator 298 before returning the filter value to EU 110. As such, MM FL 132 is configurable to perform weighted accumulation on colors of all texels within the footprint, for example as defined by filter type ID 285, and/or filter shape ID 265. In further embodiments, MM FL 132 is sufficiently generalized to also perform conventional point sampling or bi-linear filtering at a rate unimpeded by the more flexible architecture of MM FL unit 132.

While the above description summarizes the flexible sampler architecture, the interested reader is referred to the more detailed explanation of the flexible sampler architecture found in commonly assigned U.S. patent application Ser. No. 14/080,357, filed on Nov. 14, 2013, and titled "Multi-Mode Texture Sampler For Flexible Filtering of Graphical Texture Data".

A surface (or texture) state and a sampler state may be defined to sample a given texture with the system 201. The surface state defines a texture itself, while the sampler state defines how texture data is to be sampled and what kind of filtering should be done on the sampled texture data. A graphics application may define the sampler and texture states through API 280, which interfaces to the graphics hardware through GPU driver 285. One sampler state may specify fixed bilinear or anisotropic filter, while another sampler state specifies flexible filtering that allows for sampling multiple texels in a variety of ways with a single instruction. Depending on system architecture there may be sixteen, or more, concurrent sampler states made available to a shader program (e.g., executing on EU 110) at any given time. Sampler state changes are needed when a graphics application (e.g., executing on CPU 101 or EU 110) calls a shader program that relies on different sampling and/or filtering than was provided in a prior sampler state. A sampler state change is needed for example when shader employing a fixed function filter is changed to another fixed function filter, or is changed to a flexible filter.

Figure 3A:
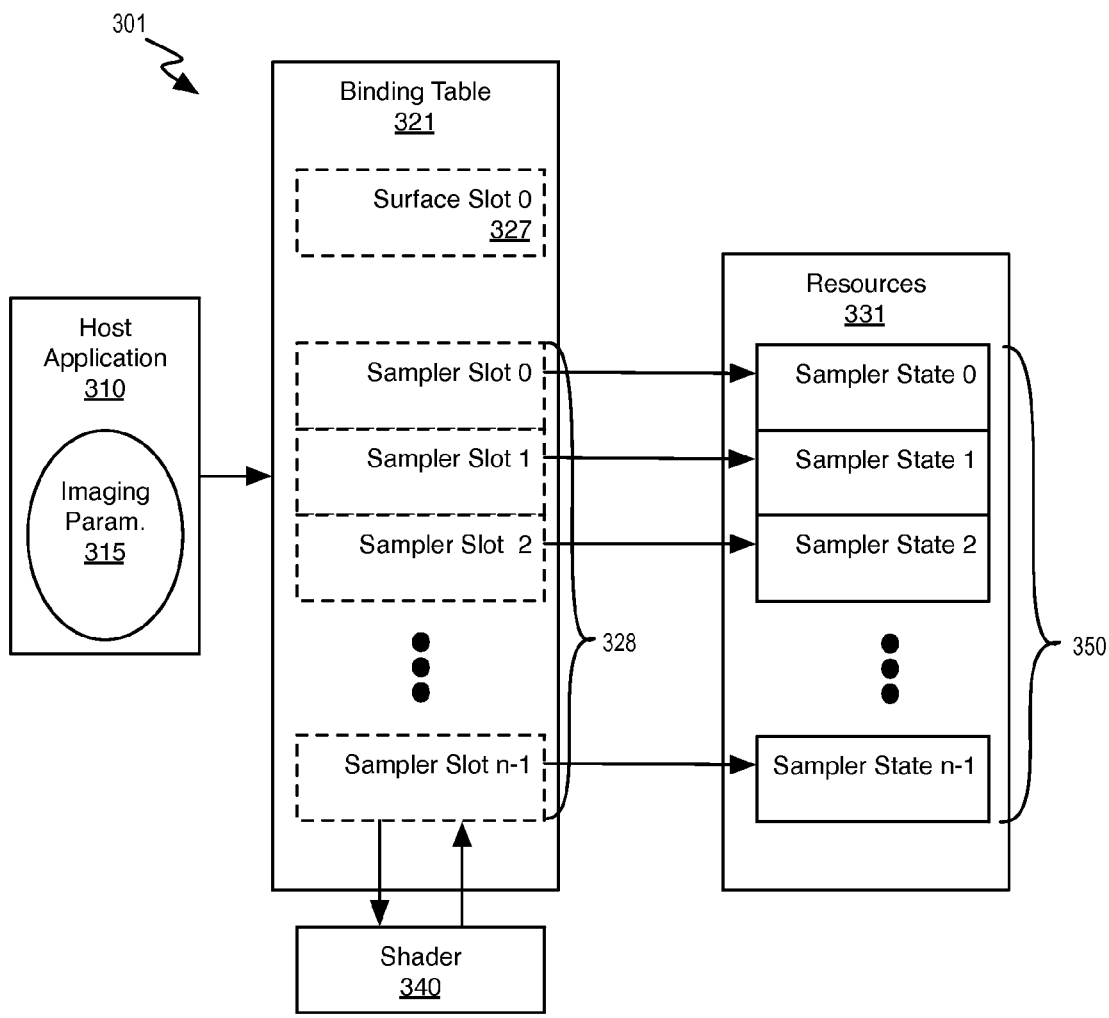
FIG. 3A is a block diagram illustrating allocation of sampler states for sampling and filtering graphical texture data, in accordance with an embodiment.

A sampler state is specified through an API by a sampler slot. A slot is a known memory location. FIG. 3A is a block diagram illustrating allocation of sampler states in a system 301, in accordance with an embodiment. The system 301 may be utilized to load and store state information employed by texture sampler hardware and accessed by shader programs. As depicted, a host application 310, which may be instantiated with CPU 102 for example, initiates a sampler state request with imaging parameters 315 that are specified by a developer of host application 315. Imagining parameters 315 are passed to an API responsible for abstracting the graphics hardware. The API may be a standardized interface, such as OpenGL and DX, or a hardware-specific API. The API exposes to the application layer a binding table 321. Binding table 321 may for example be managed by a graphics hardware driver (e.g., GPU driver 295 in FIG. 2).

Binding table 321 includes one or more surface slot 327 and a plurality of sampler slots 328. A reference to a memory location containing data of one texture surface state is stored in one surface slot 327. A reference to a memory location containing data of one sampler state is stored one sampler slot 327. A sampler slot may be passed from the graphics driver to the graphics processor (e.g., GPU 101) to configure the graphics processor according to a particular sampler state corresponding to the sampler slot. The graphics processor reads in the value stored in the sampler slot to determine where the sampler state structure is stored. Binding table 321 includes a predetermined number slots (e.g., 0-15) corresponding to a maximum number of sampler states concurrently available to a shader program. A graphics hardware driver loads binding table 321 to store the bindings for a sampler state. Where host application 310 creates a new sampler state, the graphics driver loads binding table 321, generates a hardware command allocating a sampler state from a list or pool of states available in the graphics hardware. The new state is bound to a sampler slot 328 as a hardware resource 331 by storing in the slot the new sampler state memory location reference. A bound "resource" is available for use by a shader program and may entail memory locations and/or stateful logic circuitry. Bound sampler states 350 are sampler resources configured in the graphics processor according to a particular sampler state associated with a sampler slot. A surface slot 327 may be similarly bound as a resource (i.e., memory) storing associated texture data. With bound sampler hardware states 350, a shader program can make references to sampler slots as a sampler resource is needed, allowing a given shader program to be used with different sampler states and/or surface states. For example, once a sampler state slot 0, 1, or n, is set, the sampler hardware resource bound to that slot will be used as the shader executes a draw call.

For MM sampler 121 (FIG. 2), which is operable in both flexible filter modes and fixed function modes (e.g., a bilinear mode), sampler hardware is configured to accept the filter (weighting) coefficients 270 as an additional input specified by a developer when in the flexible filter mode. One manner of associating a particular set of filter coefficients with stateful sampler hardware is to provide the coefficients as part of the sampler state data structure. Method 302 in FIG. 3B further illustrates such "static" filter coefficient programming of a sampler. During initialization, an API call at operation 371 to create a flexible sampler state 0, includes a coefficient table 0 populated by a set of coefficients. At operation 373, flexible sampler state 1 is created with coefficient table 1 populated by another set of coefficients. This same process is repeated for each flexible sampler state a shader uses. During execution, sampler state 0 is set at operation 391, for example by a graphics application running on a host processor (e.g., CPU 102). A draw call is made at operation 392. Shader program 340 executes the draw using the sampler state 0, including the set of coefficients. To use a different flexible sampler state, sampler state 1 is set at operation 393 and a draw call made at operation 394 is executed by shader program 340 using the sampler state 1.

Figure 3B:
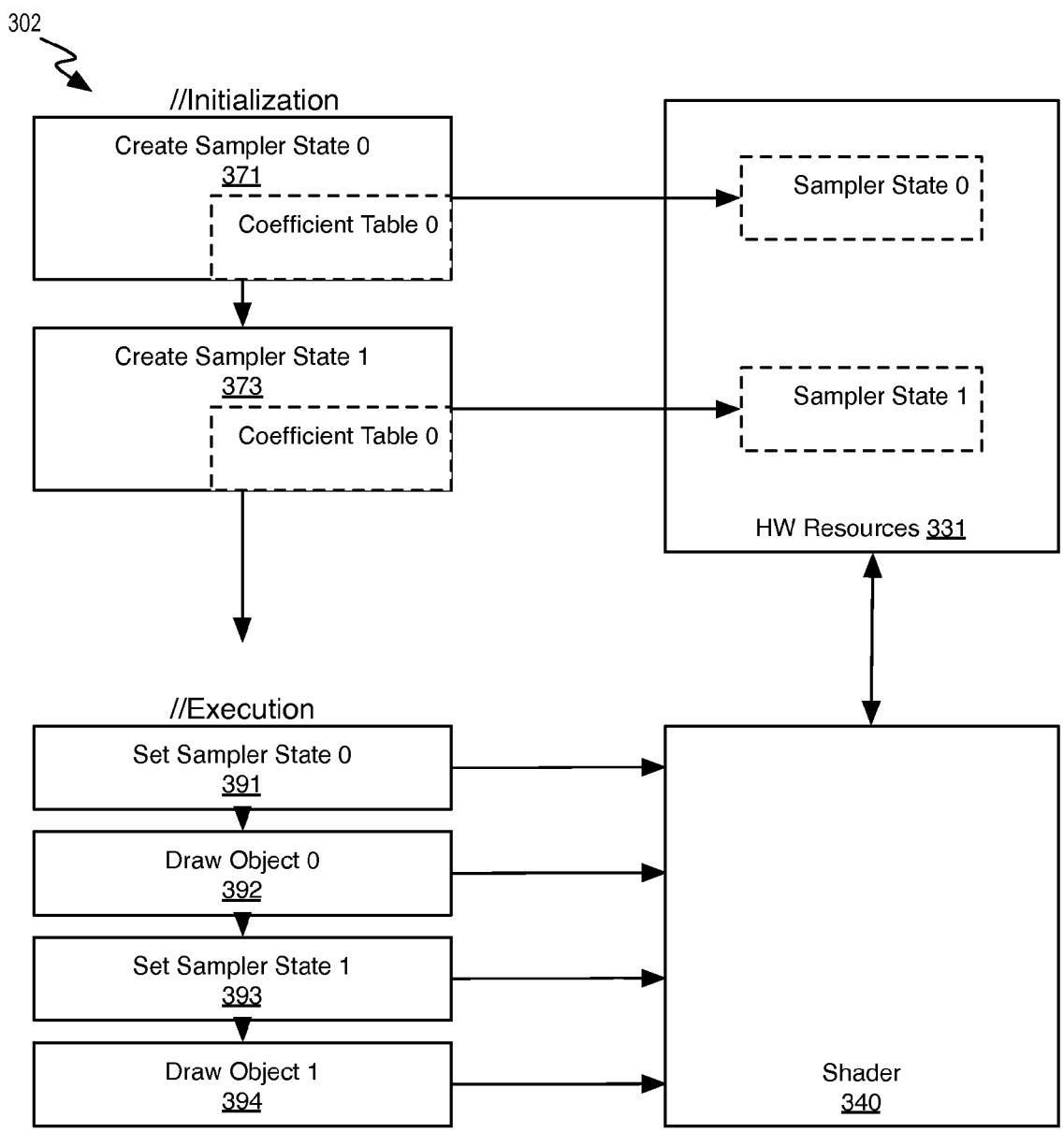
FIG. 3B is a block diagram illustrating a method for static filter coefficient programming of a sampler employed in a system for sampling and filtering graphical texture data.

For a fixed function filter, sampler states may be relatively static. However, with the greater programmability of a flexible filter, a developer may have need to change coefficient values of the flexible filter more often than other parameters of a sampler. As illustrated in FIG. 3B however, in a static filter coefficient programming architecture all sampler state information needs to be resent to the graphics hardware to change any filter coefficient. As an example, for an 8×8 texel space within which a variety of flexible filter footprints may be defined, 64 weighting coefficients are provided for the corresponding texels within a texture. If a programmer would like to modify even just one coefficient, perhaps to achieve different shadowing effect, CPU 102 may frequently need to resend state information to the graphics hardware between draw calls. Therefore, because the whole sampler state is re-created, which may require significant amount of memory to specify, the static coefficient programming architecture may incur significant overhead.

In one or more embodiments, a filter weighting coefficient table is managed as a resource independent of sampler state. A graphics hardware driver or host platform operating system may create the weighting coefficient table in any manner that permits their management as a separate resource accessible to a shader program. Although one option is to include a pointer to a coefficient table as part of the sampler state, such an architecture may still entail resending a sampler state when a new coefficient table is desired. Sampler embodiments described herein are advantageously dynamically programmable through provision of indirect sampler state slots.

With coefficient tables managed as resources separate from sampler resources, a graphics application may either explicitly or implicitly specify the coefficient table resource independently of sampler state. For example, a GPU or CPU might employ shader commands that include two identifiers, a first identifier specifying a sampler slot and a second identifier specifying a coefficient table resource to be employed by the sampler state associated with the sampler state slot specified by the first identifier. This however might entail significant changes to existing shader programs, and would require more bus bandwidth. In advantageous embodiments therefore, a coefficient table resource provisioned through an indirect sampler slot is implicitly specified by specification of a sampler state slot.

Figure 4A:
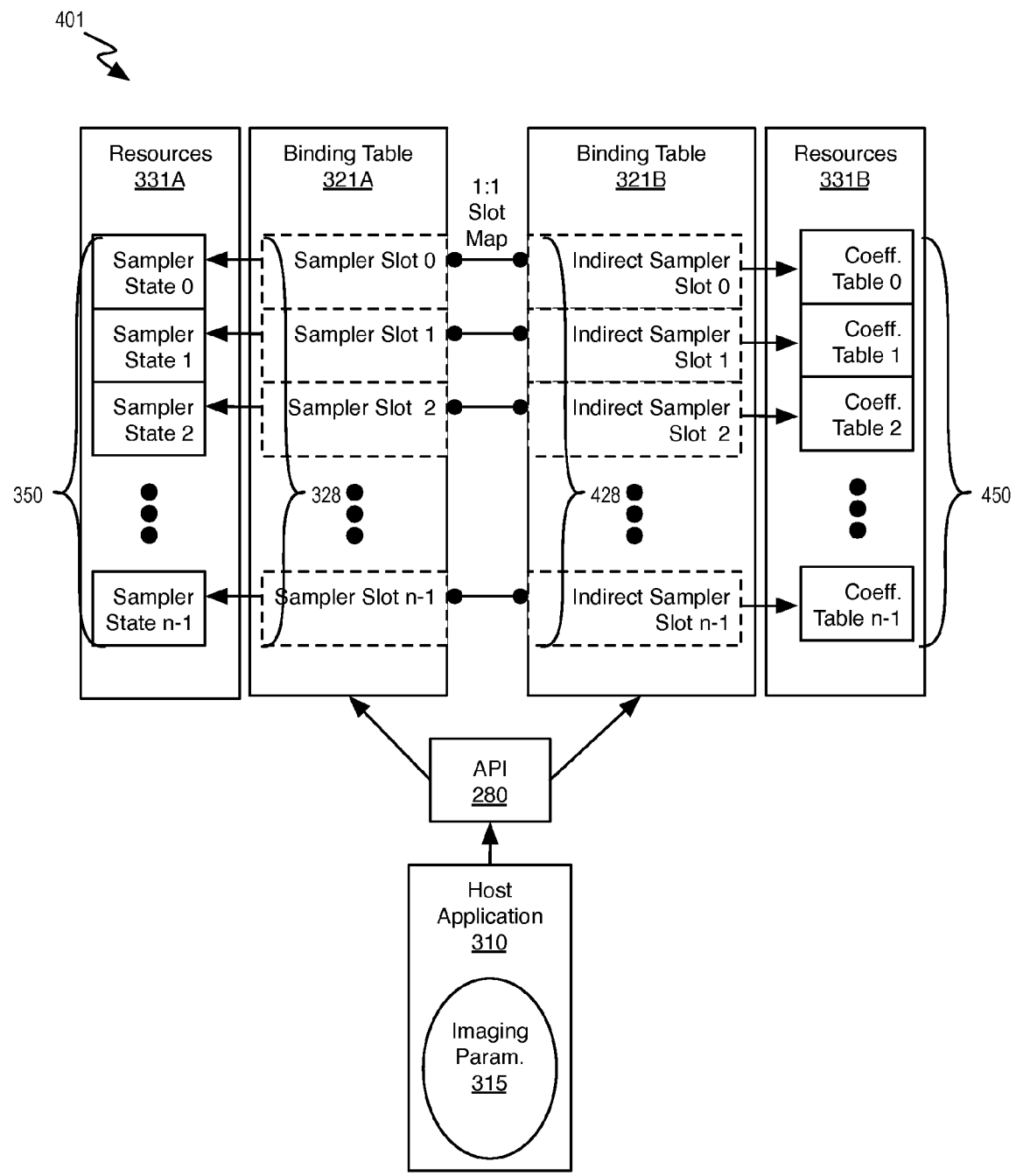
FIG. 4A is a block diagram illustrating a system with indirect sampler slots that may be utilized in a dynamically programmable sampler, in accordance with an embodiment.

FIG. 4A is a block diagram illustrating a system 401 with indirect sampler slots that may be utilized in a dynamically programmable sampler, in accordance with an embodiment. In this architecture, imaging parameters 315 are provided to API 280, which exposes a binding table 321A containing the first plurality of sampler slots 328. Sampler slots 328 are bound to sampler hardware states 350, as described above, with the stateful sampler hardware managed as hardware resources 331A. Binding table 321B contains a second plurality of slots, referred to herein as "indirect" sampler slots 428. Each indirect sampler slot is associated, or mapped, with one slot of sampler slots 328. Each indirect sampler slot is to store a reference to a memory location that stores a set of weighting coefficients. The weighting coefficients may be stored as a coefficient table (e.g., as one of coefficient tables 450) internal or external to a graphics processor. When the memory reference to the coefficient table is stored in a particular slot, the coefficient table becomes a hardware resource 331B bound to the indirect sampler slot and accessible to a shader program. For example, in FIG. 4A, coefficient table 0 is bound to indirect sampler slot 0. In an exemplary embodiment, the reference stored in an indirect sampler slot is a pointer advantageously having sufficient bit width to fully specify and a memory address accessible to both the graphic processor (e.g., GPU 101 in FIG. 1A), and the processor of the host platform (e.g., CPU 102). The pointer may therefore further reference a graphics address remapping table (GART) or graphics translation table (GTT).

In the exemplary embodiment, there is a 1:1 mapping between sampler slot and indirect sampling slot. Each indirect sampler state slot has a 1:1 correspondence with a sampler state slot. Hence, the number of permissible indirect sampler states is equal to the number of concurrent sampler states permitted by a given hardware architecture and API. For example, where 16 different parallel sampler states are permitted, each of indirect sampler slots 0-15 may be utilized to uniquely define one coefficient table. The mapping between sampler slot and indirect sampling slot may be provided in any manner, for example by the graphics hardware driver, to pair one sampler slot with one indirect sampling slot. In the illustrated embodiment, slot position indices in the linear array of sampler slots 328 are paired with the same slot position indices in the linear array of indirect sampler slots 428. Sampler slot 0 is associated with indirect sampler slot 0, and sampler slot 1 is associated with indirect sampler slot 0, etc. Alternatively, a mapping table may provide the association between any one sampler slot and any one indirect sampler slot.

A coefficient table reference stored to the indirect sampler slot may be updated independently of any sampler state resources. In an embodiment, a flexible sampler in the graphics hardware may be reprogrammed without modifying the sampler state, and so is referred to herein as dynamically programmable. A flexible sampler may be reprogrammed without a state change by updating the coefficient table reference stored in the associated indirect sampler slot. When the reference associated with a particular indirect sampler state slot is updated, the updated reference will then be accessed for any subsequent draw call using the particular sampler slot that is associated with the indirect sampler slot. The different set of weighting coefficients referenced by the indirect sampler slot may modify operation of the flexible filter, for example by changing the filter footprint, or filter convolution function, etc.

Figure 4B:
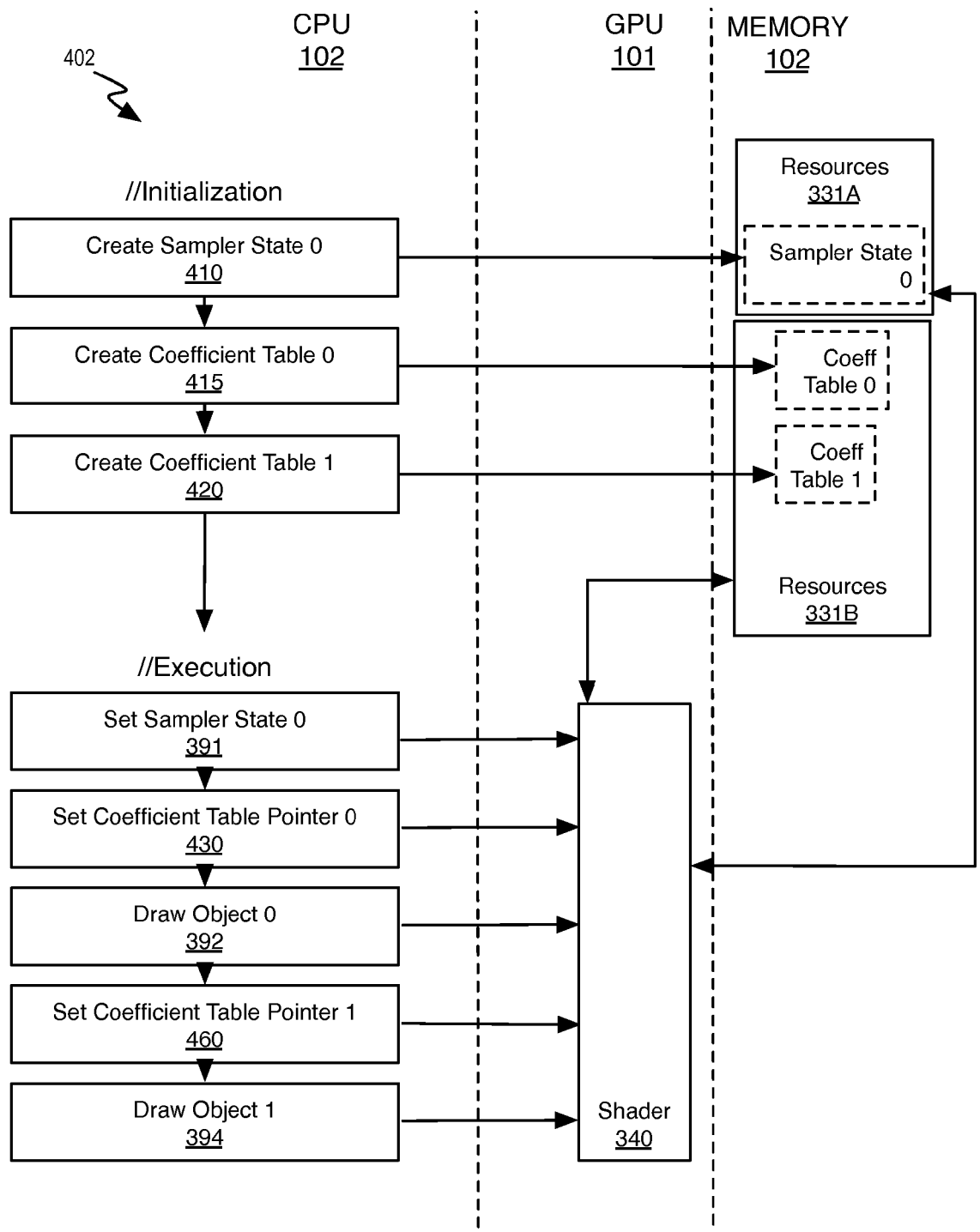
FIGS. 4B, 4C, 4D, and 4E are block diagrams illustrating methods and systems dynamically allocating filter coefficients as a resource to a flexible sampler, in accordance with an embodiment.

FIG. 4B is a block diagram illustrating a dynamic sampler programming method 402 where a coefficient table reference is changed without a change in sampler state. In the exemplary embodiment, method 402 is computer-implemented, and more specifically, at least a portion of method 402 is performed by logic circuitry implementing system 401 depicted in FIG. 4A. The logic circuitry may be disposed within GPU 101, or CPU 102. In further embodiments, at least a portion of method 402 is performed by logic circuitry disposed within both GPU 101 and CPU 102 with operations performed by first logic circuitry of CPU 102 triggering, or supported by, operations performed by second logic circuitry of GPU 101. In one advantageous embodiment, logic circuitry performing one or more portion of method 402 is configured at least in part by instructions stored on a computer readable media to perform the one or more portion of method 402. In an alternative embodiment, logic circuitry performing one or more portion of method 402 is fixed function firmware configured to perform one or more portion of method 402.

In method 402, a first sampler state is created in a first memory location at operation 410. In the exemplary embodiment, the first sampler state specifies a flexible sampler that is operable to weight each sampled texel value within a filter footprint with a predetermined weighting coefficient. A first coefficient table (e.g., coefficient table 0) is allocated to a second memory location at operation 415. The first coefficient table is populated with the first set of texel weighting coefficients. At operation 420 a second coefficient table (e.g., coefficient table 1) is similarly allocated and populated with a second set of texel weighting coefficients at a third memory location.

In the execution phase, the shader sampler state is set to a first sampler state (e.g., sampler state 0) at operation 391. A reference to the first memory location is stored in a first sampler slot (e.g., sampler slot 0) to bind the first sampler state (sampler state 0) as a hardware resource 331A of shader program 340. At operation 430, a coefficient table pointer is set referencing the shader to the second memory location where a first coefficient table (coefficient table 0) is stored. A reference to the second memory location may be stored in the indirect sampler slot associated (e.g., mapped to) the first sampler slot. The first coefficient table is thus associated with the first sampler state. At operation 392, the draw call is made to shader program 340. Shader program 340 executes the draw, accessing the coefficient table 0 based on the pointer. The flexible sampler specified by the sampler state 0 and the first set of coefficients is then used by GPU 101 in the draw. At operation 460, the coefficient table pointer is set to reference the third memory location where the second coefficient table is stored (e.g., coefficient table 1). Because indirect sampler slots are known memory locations, a processor may write the updated reference to indirect sampler slot 0, effectively re-binding the indirect sampler slot to update the coefficient table resource associated with the first sampler state. In the illustrated embodiment, CPU 101 performs the writing to update the reference. However, in exemplary embodiments where the coefficient set identifier is addressable by both a GPU and a CPU of a host platform, the coefficient table pointer is advantageously writeable by both the GPU and CPU. Either the CPU or GPU may then be utilized to write the pointer to memory to update the coefficients used by a given sampler state. With an updated pointer to a third memory location stored in the indirect sampler slot, shader program 340 executes the subsequent draw call at operation 394 using coefficient table 1 and sampler state 0 (sampler state having not been updated).

Figure 4C:
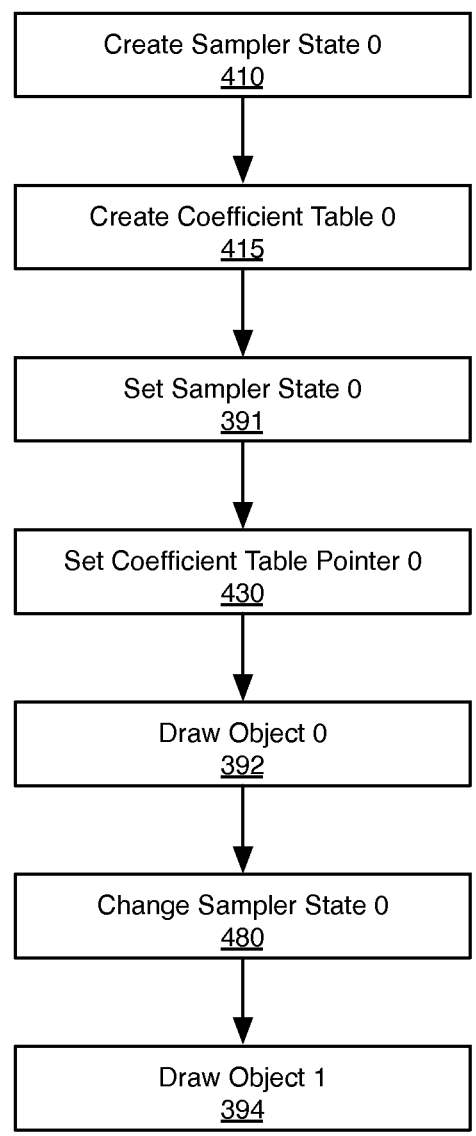

In another embodiment, a sampler state may be changed without re-sending weighting coefficients to the graphics hardware. Embodiments where the sampler state is changed without changing the weighting coefficients proceeds in a similar manner. FIG. 4C illustrates a method 403 where flexible filter sampler state is changed independently of weighting coefficient resources. Such a method reduces the overhead of re-binding samplers since the weighting coefficient table is a separately managed resource. In the exemplary embodiment, method 403 is computer-implemented, and more specifically, at least a portion of method 403 is performed by logic circuitry implementing system 401 depicted in FIG. 4A. The logic circuitry may be disposed within GPU 101, or CPU 102. In further embodiments, at least a portion of method 403 is performed by logic circuitry disposed within both GPU 101 and CPU 102 with operations performed by first logic circuitry of CPU 102 triggering, or supported by, operations performed by second logic circuitry of GPU 101. In one advantageous embodiment, logic circuitry performing one or more portion of method 403 is configured at least in part by instructions stored on a computer readable media to perform the one or more portion of method 403. In an alternative embodiment, logic circuitry performing one or more portion of method 403 is fixed function firmware configured to perform one or more portion of method 403.

In method 403, a first sampler state (state 0) is created in the first memory location at operation 410 as described above. This first sampler state may again specify a flexible sampler operable to weight a sampled texel value or plurality of texel values for each input texture address and to weight each sampled texel value with a predetermined weighting coefficient. The reference to the first memory location is stored in the first sampler slot to bind the first sampler state to the first sampler slot. At operation 420, a first coefficient table (table 0) in a second memory location is populated with a first set of texel weighting coefficients and a pointer to the second memory location is stored in the first (or corresponding) indirect sampler slot. The coefficient table pointer is set to the second memory location at operation 430, as previously described. Upon receiving a first draw request at operation 392, the first coefficient table is accessed based on the first pointer and a first draw is performed with the first sampler state using the first set of texel weighting coefficients. At operation 480, the first sampler state is modified (e.g., first sampler slot re-bound to a different sampler state resource). The pointer in the first indirect sampler slot however is maintained. Upon receiving a second draw request at operation 394, the coefficient table is again accessed based on the pointer, with draw performed using the modified first sampler state, but still with the first set of texel weighting coefficients referenced by the pointer.

A flexible sampler is also dynamically programmable by modifying the coefficients stored in a particular coefficient table that is identified by a reference stored in an indirect sampler slot. When the coefficients associated with a particular table referenced by pointer in an indirect sampler state slot are updated, the updated coefficients will then be accessed by any subsequent draw call to the particular sampler slot that is associated with the indirect sampler slot. The different set of weighting coefficients referenced by the same pointer stored in the indirect sampler slot may modify operation of the flexible sampler, for example by changing the filter footprint, or filter convolution function, etc., without a sampler state change.

Figure 4D:
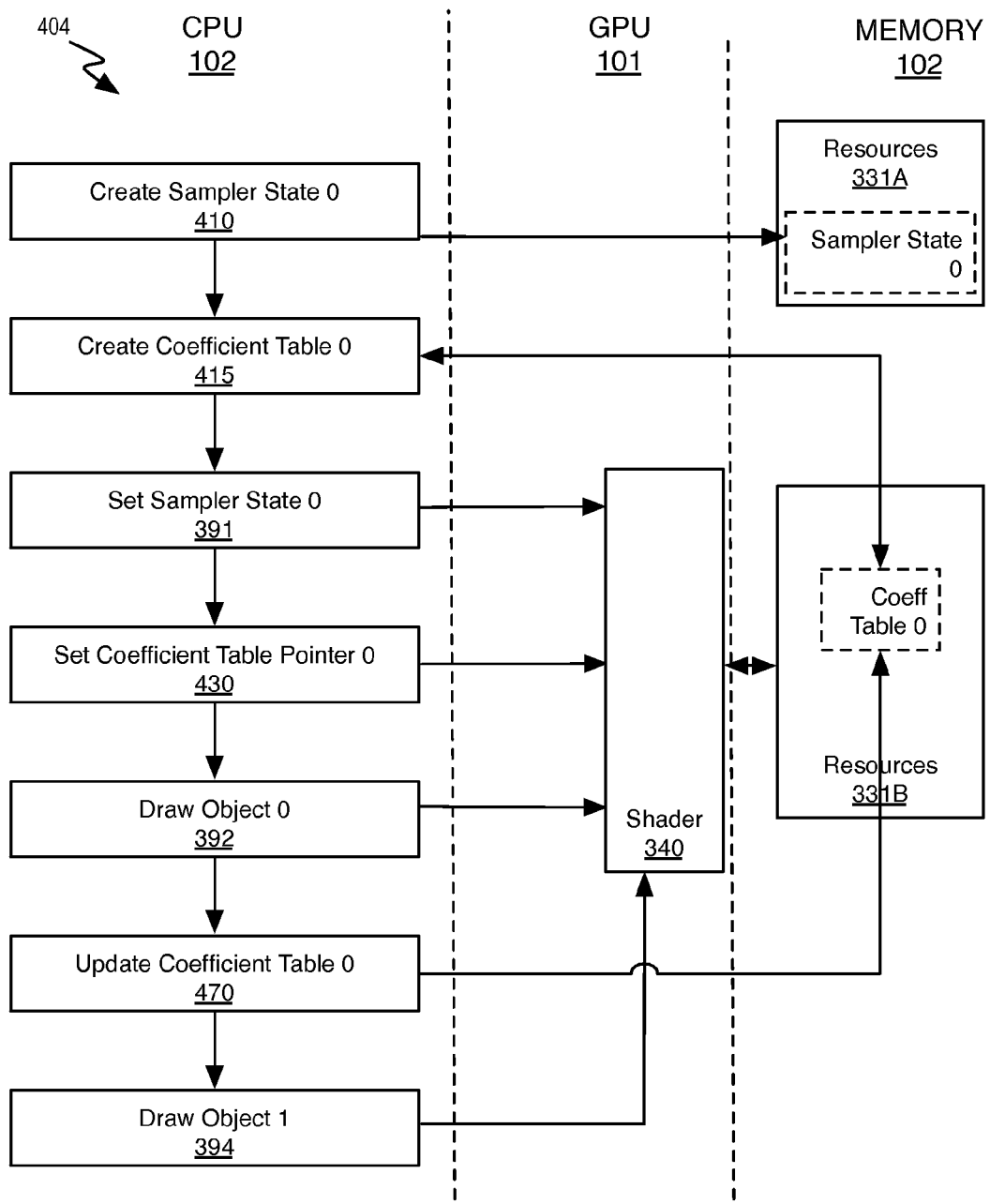

FIG. 4D is a block diagram illustrating a dynamic sampler programming method 404 where weighting coefficient values are changed within a coefficient table without a change in sampler state. In the exemplary embodiment, method 404 is computer-implemented, and more specifically, at least a portion of method 404 is performed by logic circuitry implementing system 401 depicted in FIG. 4A. The logic circuitry may be disposed within GPU 101, or CPU 102. In further embodiments, at least a portion of method 404 is performed by logic circuitry disposed within both GPU 101 and CPU 102 with operations performed by first logic circuitry of CPU 102 triggering, or supported by, operations performed by second logic circuitry of GPU 101. In one advantageous embodiment, logic circuitry performing one or more portion of method 404 is configured at least in part by instructions stored on a computer readable media to perform the one or more portion of method 404. In an alternative embodiment, logic circuitry performing one or more portion of method 404 is fixed function firmware configured to perform one or more portion of method 404.

In method 404, a first sampler state is created in a first memory location at operation 410. In the exemplary embodiment, the first sampler state specifies a flexible sampler that is operable to weight each sampled texel value within a filter footprint with a predetermined weighting coefficient. A first coefficient table (e.g., coefficient table 0) is allocated to a second memory location at operation 415. The first coefficient table is populated with the first set of texel weighting coefficients. The sampler is set to a first sampler state (e.g., sampler state 0) at operation 391. A reference to the first memory location is stored in a first sampler slot (e.g., sampler slot 0) to bind the first sampler state (sampler state 0) as a hardware resource 331A of shader program 340. At operation 430, a coefficient table pointer is set referencing the shader to the second memory location where a first coefficient table (coefficient table 0) is stored. The first coefficient table may be associated with the first sampler state by storing a reference to the second memory location in the indirect sampler slot associated (e.g., mapped to) the first sampler slot. At operation 392, the draw call is made to shader program 340. In response to the draw request, shader program 340 accesses the coefficient table 0 based on the pointer. The flexible sampler specified by the sampler state 0 and first set of coefficients is then used by GPU 101 in the draw. At operation 470, one or more value is written to the first coefficient table stored at the second memory location. For example, one or more coefficients within the first set of texel weighting coefficients is replaced to generate a second set of texel weighting coefficients. More specifically, a new coefficient value is written to a memory location storing an old coefficient value.

Notably, writing new coefficient values to an existing coefficient table does not require allocating a separate coefficient table. In some embodiments where CPU 102 generates hardware commands and allocates memory for a coefficient table, the API stores the reference to the coefficient table in a memory location accessible to GPU 103. GPU 103 can then modify the coefficients employed by a particular sampler state by writing to that location in memory.

Figure 4E:
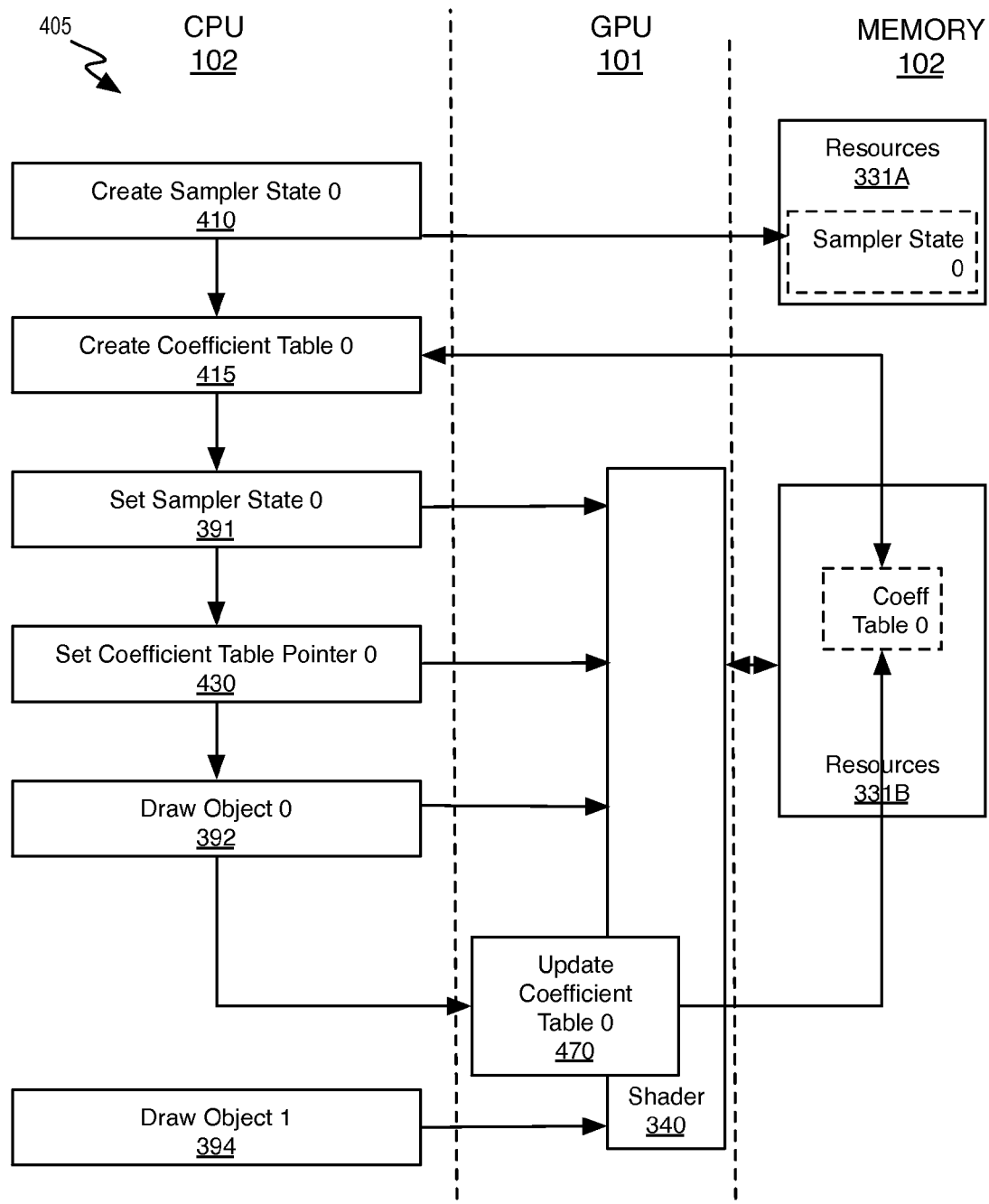

FIG. 4E is a block diagram illustrating a dynamic sampler programming method 405 where filter coefficients are managed as resources independent of a sampler state data structure and are directly accessible to a GPU. In the exemplary embodiment, method 405 is computer-implemented, and more specifically, at least a portion of method 405 is performed by logic circuitry implementing system 401 depicted in FIG. 4A. The logic circuitry may be disposed within GPU 101, or CPU 102. In further embodiments, at least a portion of method 405 is performed by logic circuitry disposed within both GPU 101 and CPU 102 with operations performed by first logic circuitry of CPU 102 triggering, or supported by, operations performed by second logic circuitry of GPU 101. In one advantageous embodiment, logic circuitry performing one or more portion of method 405 is configured at least in part by instructions stored on a computer readable media to perform the one or more portion of method 405. In an alternative embodiment, logic circuitry performing one or more portion of method 405 is fixed function firmware configured to perform one or more portion of method 405.

In method 405, a first sampler state is created in a first memory location at operation 410. In the exemplary embodiment, the first sampler state specifies a flexible sampler that is operable to weight each sampled texel value within a filter footprint with a predetermined weighting coefficient. A first coefficient table (e.g., coefficient table 0) is allocated to a second memory location at operation 415. The first coefficient table is populated with the first set of texel weighting coefficients. The sampler state is set to a first sampler state (e.g., sampler state 0) at operation 391. A reference to the first memory location is stored in a first sampler slot (e.g., sampler slot 0) to bind the first sampler state (sampler state 0) as a hardware resource 331A of shader program 340. At operation 430, a coefficient table pointer is set referencing the shader to the second memory location where a first coefficient table (coefficient table 0) is stored. The first coefficient table may be associated with the first sampler state by storing a reference to the second memory location in the indirect sampler slot associated (e.g., mapped to) the first sampler slot. At operation 392, the draw call is made to shader program 340. An indication that a coefficient table needs updating is communicated to GPU 101 the draw call. In response to the draw request, shader program 340 accesses the coefficient table 0 based on the pointer and, at operation 470, writes one or more value to the first coefficient table stored at the second memory location. For example, GPU 101 may replace one or more coefficient within the first set of texel weighting coefficients to generate a second set of texel weighting coefficients. In the draw, GPU 101 uses the flexible sampler specified by the sampler state 0 and the updated first set of coefficients. A subsequent draw at operation 394 further utilizes the updated first set of coefficients.

Figure 5:
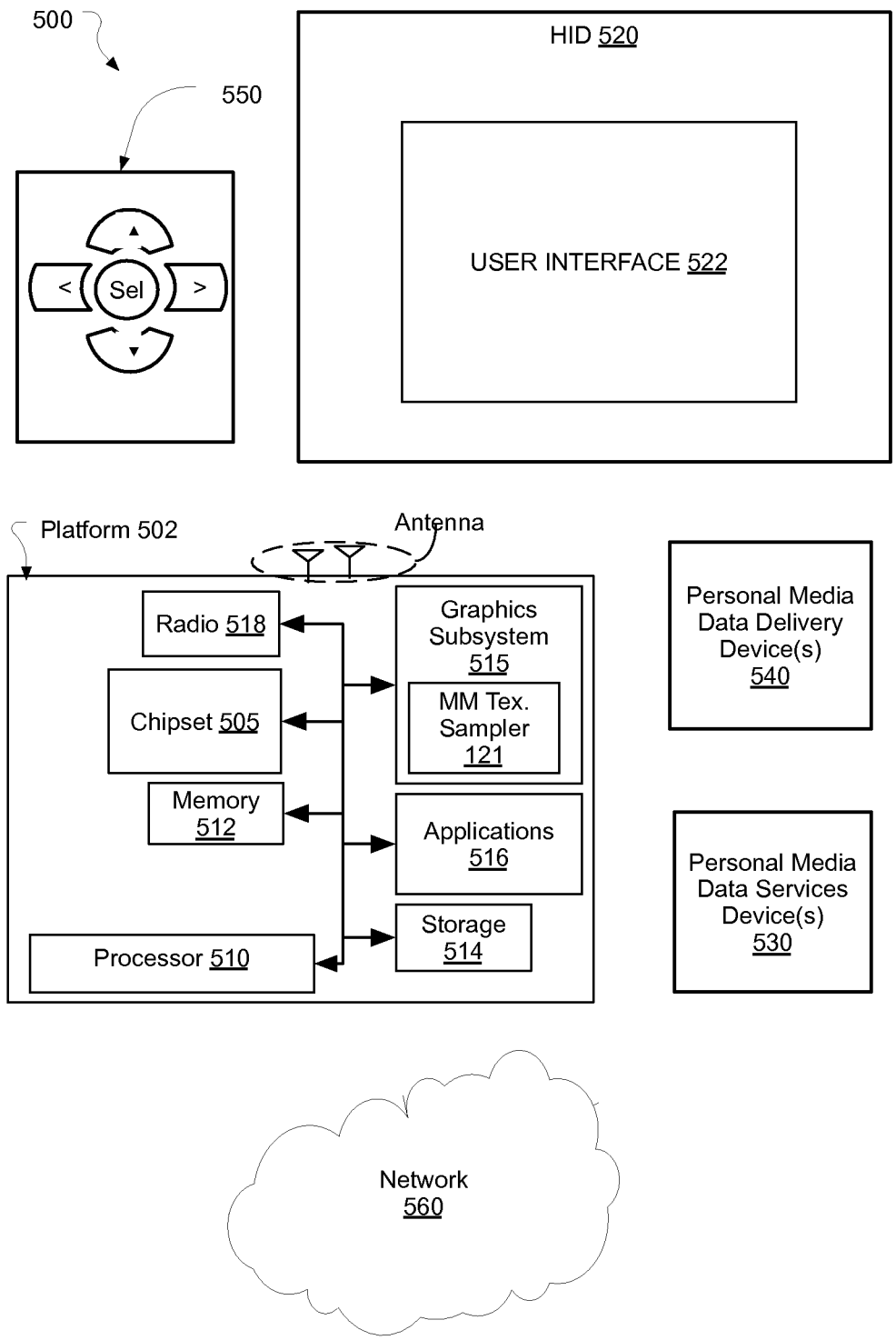
FIG. 5 is an illustrative diagram of an exemplary system, in accordance with one or more embodiments.

FIG. 5 is an illustrative diagram of an exemplary system 500, in accordance with embodiments. System 500 may implement all or a subset of the various functional blocks depicted in FIGS. 2, 3A, and 4A. For example, in one embodiment the dynamically programmable MM texture sampler 121 is included in the system 500. System 500 may be a mobile device although system 500 is not limited to this context. For example, system 500 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 500 may also be an infrastructure device. For example, system 500 may be incorporated into a large format television, set-top box, desktop computer, or other home or commercial network device.

In various implementations, system 500 includes a platform 502 coupled to a HID 520. Platform 502 may receive captured personal media data from a personal media data services device(s) 530, a personal media data delivery device(s) 540, or other similar content source. A navigation controller 550 including one or more navigation features may be used to interact with, for example, platform 502 and/or HID 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 510 may be a multi-core processor(s), multi-core mobile processor(s), and so forth. In one exemplary embodiment, processor 510 invokes or otherwise implements processes and/or methods of the CMMS 101 and the various modules described in as components of CMMS 101 elsewhere herein.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video media data for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, Display Port, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The texture sampler features and related texture sampling and filtering techniques described herein may be implemented in various hardware architectures. For example, graphics and/or video functionality may be integrated within a chipset. Alternatively, a discrete graphics and/or video processor may be used. As still another embodiment, the methods and functions described herein may be provided by a general purpose processor, including a multi-core processor. In further embodiments, the methods and functions may be implemented in a purpose-built consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, HID 520 may include any television type monitor or display. HID 520 may include, for example, a computer display screen, touch screen display, video monitor, television-like device, and/or a television. HID 520 may be digital and/or analog. In various implementations, HID 520 may be a holographic display. Also, HID 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on HID 520.

In various implementations, personal media services device(s) 530 may be hosted by any national, international and/or independent service and thus accessible to platform 502 via the Internet, for example. Personal media services device(s) 530 may be coupled to platform 502 and/or to display 520. Platform 502 and/or personal services device(s) 530 may be coupled to a network 560 to communicate (e.g., send and/or receive) media information to and from network 560. Personal media delivery device(s) 540 also may be coupled to platform 502 and/or to HID 520.

In various implementations, personal media data services device(s) 530 may include a cable television box, personal computer, network, telephone, Internet enabled devices or appliance capable of delivering digital information and/or content, and any other similar device capable of unidirectionally or bidirectionally communicating content between a media data provider and platform 502, via network 560 or directly. It will be appreciated that the content may be communicated unidirectionally and/or bidirectionally to and from any one of the components in system 500 and a provider via network 560. Examples of personal media include any captured media information including, for example, video, music, medical and gaming information, and so forth.

Personal media data services device(s) 530 may receive content including media information with examples of content providers including any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., HID 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or HID 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other personal media services device(s) 530 or personal media delivery device(s) 540 even when the platform is turned "off." In addition, chipset 505 may include hardware and/or software support for 8.1 surround sound audio and/or high definition (5.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and personal media data services device(s) 530 may be integrated, or platform 502 and captured media data delivery device(s) 640 may be integrated, or platform 502, personal media services device(s) 530, and personal media delivery device(s) 540 may be integrated, for example. In various embodiments, platform 502 and HID 520 may be an integrated unit. HID 520 and content service device(s) 530 may be integrated, or HID 520 and personal media delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

As described above, system 500 may be embodied in varying physical styles or form factors. FIG. 8 illustrates embodiments of a small form factor device 800 in which system 500 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 6:
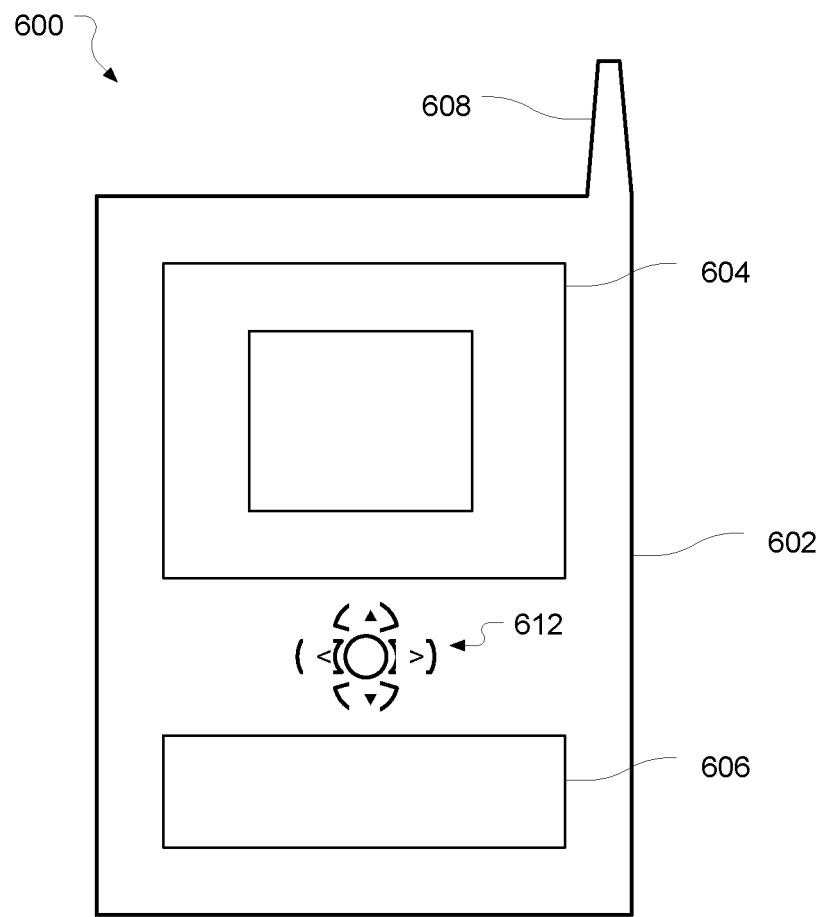
FIG. 6 is an illustrative diagram of an exemplary system, arranged in accordance with an embodiment.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: programs, applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Instructions representing various logic within the processor, which when read by a machine may also cause the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to particular exemplary embodiments.

In some implementations, a method of allocating filter-weighting coefficients to graphical texture sampler, the method may include providing a binding table with a first sampler slot to store a reference to a first memory location storing a first sampler state. A binding table may be provided with a first indirect sampler slot to store a reference to a second memory location containing a first set of texel weighting coefficients. The first sampler slot may be mapped to the first indirect sampler slot to associate the first sampler state with the set of texel weighting coefficients.

In some examples, the first sampler slot may be one of a plurality of sampler slots, and the plurality includes one sampler slot for each sampler state concurrently available to a shader. The first indirect sampler slot may be one of a plurality of indirect sampler slots available to the shader, and the plurality of indirect sampler slots includes one indirect sampler slot for each direct sampler slot. Each sampler slot may be mapped to one of the indirect sampler slots.

In a further example, the first sampler state may be created in the first memory location, the first sampler state specifying a sampler operable to weight a sampled texel value or plurality of texel values for each input texture address and to weight each sampled texel value with a predetermined weighting coefficient. The reference may be stored to the first memory location in the first sampler slot to bind the first sampler state to the first sampler slot. A coefficient table populated with the first set of texel weighting coefficients may be created in the second memory location. A pointer may be stored to the second memory location in the first indirect sampler slot to bind the coefficient table to the first sampler state.

In a still further example, a flexible texture sampler state may be created in the first memory location, the flexible sampler state specifying a sampler operable to sample a plurality of texel values for each input texture address and to weight each sampled texel value with a predetermined weighting coefficient. The reference may be stored to the first memory location in the first sampler slot to bind the flexible texture sampler to the first sampler slot. A first coefficient table populated with the first set of texel weighting coefficients may be created in the second memory location. A pointer may be stored to the second memory location in the indirect sampler slot. A draw request may be received. The coefficient table may be accessed based on the pointer. A draw may be performed with the flexible texture sampler state using the first set of texel weighting coefficients.

In another example, the first sampler state may be created in the first memory location, the first sampler state specifying a sampler operable to weight a sampled texel value or plurality of texel values for each input texture address and to weight each sampled texel value with a predetermined weighting coefficient. The reference may be stored to the first memory location in the first sampler slot to bind the first sampler state to the first sampler slot. A first coefficient table populated with the first set of texel weighting coefficients may be created in the second memory location. A pointer may be stored to the second memory location in the first indirect sampler slot. Modification may be made to operation of a sampler operable in the first sampler state without updating the first sampler state by at least one of: writing to the second memory location to generate a second set of texel weighting coefficients by replacing one or more coefficient within the first set of texel weighting coefficients; or updating the pointer to reference a third memory location storing a second coefficient table populated with a different set of texel weighting coefficients.

In one example, the first sampler state may be created in the first memory location, the first sampler state specifying a sampler operable to weight a sampled texel value or plurality of texel values for each input texture address and to weight each sampled texel value with a predetermined weighting coefficient. The reference may be stored to the first memory location in the first sampler slot to bind the first sampler state to the first sampler slot. A first coefficient table populated with the first set of texel weighting coefficients may be created in the second memory location. A pointer may be stored to the second memory location in the first indirect sampler slot. A first draw request may be received. The first coefficient table may be accessed based on the first pointer. A first draw may be performed with the first sampler state using the first set of texel weighting coefficients. The first sampler state may be modified while maintaining the pointer in first indirect sampler slot. A second draw request may be received. The coefficient table may be accessed based on the pointer. A second draw may be performed with the modified first sampler state using the first set of texel weighting coefficients.

In a further example, a first sampler state may be created in the first memory location, the first sampler state specifying a sampler operable to weight a sampled texel value or plurality of texel values for each input texture address and to weight each sampled texel value with a predetermined weighting coefficient. The reference may be stored to the first memory location in the first sampler slot to bind the first sampler state to the first sampler slot. A first coefficient table populated with the first set of texel weighting coefficients may be created in the second memory location. A second coefficient table populated with a second set of texel weighting coefficients may be created in a third memory location. A first pointer may be stored to the second memory location in the first indirect sampler slot to bind the coefficient table to the first sampler state. A first draw request may be received. The first coefficient table may be accessed based on the first pointer. A first draw may be performed with the first sampler state using the first set of texel weighting coefficients. A second pointer may be stored to the third memory location in the first indirect sampler slot to bind the second coefficient table to the first sampler state. A second draw request may be received. The second coefficient table may be accessed based on the second pointer. A second draw may be performed with the first sampler state using the second set of texel weighting coefficients.

In a still further example, a first sampler state may be created in the first memory location, the first sampler state specifying a sampler operable to weight a sampled texel value or plurality of texel values for each input texture address and to weight each sampled texel value with a predetermined weighting coefficient. The reference may be stored to the first memory location in the first sampler slot to bind the first sampler state to the first sampler slot. A coefficient table populated with the first set of texel weighting coefficients may be created in the second memory location. A pointer may be stored to the second memory location in the first indirect sampler slot to bind the coefficient table to the first sampler state. A first draw request may be received. The coefficient table may be accessed based on the pointer. A first draw may be performed with the first sampler state using the first set of texel weighting coefficients. Modification may be made to operation of a sampler operable in the first sampler state without updating the first sampler state by at least one of: writing to the second memory location to generate a second set of texel weighting coefficients by replacing one or more coefficient within the first set of texel weighting coefficients; or updating the pointer to reference a third memory location storing a second coefficient table populated with a different set of texel weighting coefficients. A second draw request may be received. The coefficient table may be accessed based on the pointer. A second draw may be performed with the first sampler state using the second set of texel weighting coefficients.

In another implementation, a dynamically programmable texture sampling system, the system may include: a memory; first logic circuitry to: store, in a first sampler slot of a binding table, a reference to a first memory location storing a first sampler state; store, in a first indirect sampler slot of a binding table, a reference to a second memory location containing a first set of texel weighting coefficients; and map the first sampler slot to the first indirect sampler slot to associate the first sampler state with the set of texel weighting coefficients.

In one example, the system may include a texture sampler including sampler logic circuitry operable in the first sampler state to: sample a plurality of texel values for each input texture address, and/or to weight each sampled texel value with a predetermined weighting coefficient.

In another example, the first sampler slot may be one of a plurality of sampler slots in the binding table, and the plurality includes one sampler slot for each sampler state concurrently available to a shader. The first indirect sampler slot may be one of a plurality of indirect sampler slots in the binding table available to the shader, and the plurality of indirect sampler slots includes one indirect sampler slot for each direct sampler slot. The logic circuitry may be to map each sampler slot to one of the indirect sampler slots.

In a further example, the logic circuitry may create the first sampler state in the first memory location, the first sampler state specifying a sampler operable to weight a sampled texel value or plurality of texel values for each input texture address and to weight each sampled texel value with a predetermined weighting coefficient. The reference may be stored to the first memory location in the first sampler slot to bind the first sampler state to the first sampler slot. A coefficient table populated with the first set of texel weighting coefficients may be created in the second memory location. A pointer may be stored to the second memory location in the first indirect sampler slot.

In a still further example, the logic circuitry may create a flexible texture sampler state in the first memory location, the flexible sampler state specifying a sampler operable to sample a plurality of texel values for each input texture address and to weight each sampled texel value with a predetermined weighting coefficient. The logic circuitry may store the reference to the first memory location in the first sampler slot to bind the flexible texture sampler to the first sampler slot. The logic circuitry may create in the second memory location a first coefficient table populated with the first set of texel weighting coefficients. The logic circuitry may store a pointer to the second memory location in the indirect sampler slot. The logic circuitry may receive a draw request. The logic circuitry may access the coefficient table based on the pointer. The logic circuitry may perform a draw with the flexible texture sampler state using the first set of texel weighting coefficients.

In another example, the logic circuitry may create the first sampler state in the first memory location, the first sampler state specifying a sampler operable to weight a sampled texel value or plurality of texel values for each input texture address and to weight each sampled texel value with a predetermined weighting coefficient. The logic circuitry may store the reference to the first memory location in the first sampler slot to bind the first sampler state to the first sampler slot. The logic circuitry may create in the second memory location a first coefficient table populated with the first set of texel weighting coefficients. The logic circuitry may store a pointer to the second memory location in the first indirect sampler slot. The logic circuitry may modify operation of a sampler operable in the first sampler state without updating the first sampler state by at least one of: writing to the second memory location to generate a second set of texel weighting coefficients by replacing one or more coefficient within the first set of texel weighting coefficients; and/or updating the pointer to reference a third memory location storing a second coefficient table populated with a different set of texel weighting coefficients.

In a further implementation, in one or more computer readable media with instructions stored thereon, which when executed by a processor, cause the processor to perform a method of allocating filter weighting coefficients to graphical texture sampler, the method may include: providing a binding table with a first sampler slot to store a reference to a first memory location storing a first sampler state. A binding table may be provided with a first indirect sampler slot to store a reference to a second memory location containing a first set of texel weighting coefficients. The first sampler slot may be mapped to the first indirect sampler slot to associate the first sampler state with the set of texel weighting coefficients.

In one example, the instructions may cause the processor to provide the binding tables, where: the first sampler slot may be one of a plurality of sampler slots, and the plurality includes one sampler slot for each sampler state concurrently available to a shader; the first indirect sampler slot may be one of a plurality of indirect sampler slots available to the shader, and the plurality of indirect sampler slots includes one indirect sampler slot for each direct sampler slot; and/or each sampler slot may be mapped to one of the indirect sampler slots.

In another example, the instructions may create the first sampler state in the first memory location, the first sampler state specifying a sampler operable to weight a sampled texel value or plurality of texel values for each input texture address and to weight each sampled texel value with a predetermined weighting coefficient. The instructions may store the reference to the first memory location in the first sampler slot to bind the first sampler state to the first sampler slot. The instructions may create in the second memory location a coefficient table populated with the first set of texel weighting coefficients. The instructions may store a pointer to the second memory location in the first indirect sampler slot.

In another example, the instructions may create a flexible texture sampler state in the first memory location, the flexible sampler state specifying a sampler operable to sample a plurality of texel values for each input texture address and to weight each sampled texel value with a predetermined weighting coefficient. The instructions may store the reference to the first memory location in the first sampler slot to bind the flexible texture sampler to the first sampler slot. The instructions may create in the second memory location a first coefficient table populated with the first set of texel weighting coefficients. The instructions may store a pointer to the second memory location in the indirect sampler slot. The instructions may receive a draw request. The instructions may access the coefficient table based on the pointer. The instructions may perform a draw with the flexible texture sampler state using the first set of texel weighting coefficients.

In a further example, the instructions may create the first sampler state in the first memory location, the first sampler state specifying a sampler operable to weight a sampled texel value or plurality of texel values for each input texture address and to weight each sampled texel value with a predetermined weighting coefficient. The instructions may store the reference to the first memory location in the first sampler slot to bind the first sampler state to the first sampler slot. The instructions may create in the second memory location a first coefficient table populated with the first set of texel weighting coefficients. The instructions may store a pointer to the second memory location in the first indirect sampler slot. The instructions may modify operation of a sampler operable in the first sampler state without updating the first sampler state by at least one of: writing to the second memory location to generate a second set of texel weighting coefficients by replacing one or more coefficient within the first set of texel weighting coefficients; and/or updating the pointer to reference a third memory location storing a second coefficient table populated with a different set of texel weighting coefficients.

In a still further example, the instructions may create a first sampler state in the first memory location, the first sampler state specifying a sampler operable to weight a sampled texel value or plurality of texel values for each input texture address and to weight each sampled texel value with a predetermined weighting coefficient. The instructions may store the reference to the first memory location in the first sampler slot to bind the first sampler state to the first sampler slot. The instructions may create in the second memory location a first coefficient table populated with the first set of texel weighting coefficients. The instructions may create in a third memory location a second coefficient table populated with a second set of texel weighting coefficients. The instructions may set a sampler circuitry to operate in the first sampler state. The instructions may store first pointer to the second memory location in the first indirect sampler slot. The instructions may receive a first draw request. The instructions may access the first coefficient table based on the first pointer. The instructions may perform a first draw with the first sampler state using the first set of texel weighting coefficients. The instructions may store a second pointer to the third memory location in the first indirect sampler slot to bind the second coefficient table to the first sampler state. The instructions may receive a second draw request. The instructions may access the second coefficient table based on the second pointer. The instructions may perform a second draw with the first sampler state using the second set of texel weighting coefficients.

In another example, the instructions may create a first sampler state in the first memory location, the first sampler state specifying a sampler operable to weight a sampled texel value with a predetermined weighting coefficient. The instructions may store the reference to the first memory location in the first sampler slot to bind the first sampler state to the first sampler slot. The instructions may create in the second memory location a coefficient table populated with the first set of texel weighting coefficients. The instructions may store a pointer to the second memory location in the first indirect sampler slot. The instructions may receive a first draw request. The instructions may access the coefficient table based on the pointer. The instructions may perform a first draw with the first sampler state using the first set of texel weighting coefficients. The instructions may modify operation of a sampler operable in the first sampler state without updating the first sampler state by at least one of: writing to the second memory location to generate a second set of texel weighting coefficients by replacing one or more coefficient within the first set of texel weighting coefficients; and/or updating the pointer to reference a third memory location storing a second coefficient table populated with a different set of texel weighting coefficients. The instructions may receive a second draw request. The instructions may access the coefficient table based on the pointer. The instructions may perform a second draw with the first sampler state using the second set of texel weighting coefficients.

It will be recognized that the invention is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. A method of allocating filter weighting coefficients to a graphical texture sampler, the method comprising:
providing a binding table with a first sampler slot to store a reference to a first memory location storing a first sampler state;
providing a binding table with a first indirect sampler slot to store a reference to a second memory location containing a first set of texel weighting coefficients;
mapping, via hardware, or fixed function firmware of the graphical texture sampler, or a combination thereof the first sampler slot to the first indirect sampler slot to associate the first sampler state with the set of texel weighting coefficients; and
displaying, via a display, output images based at least in part on the performed mapping.

2. The method of claim 1, wherein:
the first sampler slot is one of a plurality of sampler slots, and the plurality includes one sampler slot for each sampler state concurrently available to a shader;
the first indirect sampler slot is one of a plurality of indirect sampler slots available to the shader, and the plurality of indirect sampler slots includes one indirect sampler slot for each direct sampler slot; and
each sampler slot is mapped to one of the indirect sampler slots.

3. The method of claim 1, further comprising:
creating the first sampler state in the first memory location, the first sampler state specifying a sampler operable to weight a sampled texel value or plurality of texel values for each input texture address and to weight each sampled texel value with a predetermined weighting coefficient;
storing the reference to the first memory location in the first sampler slot to bind the first sampler state to the first sampler slot;
creating in the second memory location a coefficient table populated with the first set of texel weighting coefficients; and
storing a pointer to the second memory location in the first indirect sampler slot to bind the coefficient table to the first sampler state.

4. The method of claim 1, further comprising:
creating a flexible texture sampler state in the first memory location, the flexible sampler state specifying a sampler operable to sample a plurality of texel values for each input texture address and to weight each sampled texel value with a predetermined weighting coefficient;
storing the reference to the first memory location in the first sampler slot to bind the flexible texture sampler to the first sampler slot;
creating in the second memory location a first coefficient table populated with the first set of texel weighting coefficients;
storing a pointer to the second memory location in the indirect sampler slot;
receiving a draw request;
accessing the coefficient table based on the pointer; and
performing a draw with the flexible texture sampler state using the first set of texel weighting coefficients.

5. The method of claim 1, further comprising:
creating the first sampler state in the first memory location, the first sampler state specifying a sampler operable to weight a sampled texel value or plurality of texel values for each input texture address and to weight each sampled texel value with a predetermined weighting coefficient;
storing the reference to the first memory location in the first sampler slot to bind the first sampler state to the first sampler slot;
creating in the second memory location a first coefficient table populated with the first set of texel weighting coefficients;
storing a pointer to the second memory location in the first indirect sampler slot; and
modifying operation of a sampler operable in the first sampler state without updating the first sampler state by at least one of:
writing to the second memory location to generate a second set of texel weighting coefficients by replacing one or more coefficient within the first set of texel weighting coefficients; or
updating the pointer to reference a third memory location storing a second coefficient table populated with a different set of texel weighting coefficients.

6. The method of claim 1, further comprising:
creating the first sampler state in the first memory location, the first sampler state specifying a sampler operable to weight a sampled texel value or plurality of texel values for each input texture address and to weight each sampled texel value with a predetermined weighting coefficient;
storing the reference to the first memory location in the first sampler slot to bind the first sampler state to the first sampler slot;
creating in the second memory location a first coefficient table populated with the first set of texel weighting coefficients;
storing a pointer to the second memory location in the first indirect sampler slot;
receiving a first draw request;
accessing the first coefficient table based on the first pointer; and
performing a first draw with the first sampler state using the first set of texel weighting coefficients;
modifying the first sampler state while maintaining the pointer in first indirect sampler slot
receiving a second draw request;
accessing the coefficient table based on the pointer; and
performing a second draw with the modified first sampler state using the first set of texel weighting coefficients.

7. The method of claim 1, further comprising:
creating a first sampler state in the first memory location, the first sampler state specifying a sampler operable to weight a sampled texel value or plurality of texel values for each input texture address and to weight each sampled texel value with a predetermined weighting coefficient;
storing the reference to the first memory location in the first sampler slot to bind the first sampler state to the first sampler slot;
creating in the second memory location a first coefficient table populated with the first set of texel weighting coefficients;
creating in a third memory location a second coefficient table populated with a second set of texel weighting coefficients;
storing a first pointer to the second memory location in the first indirect sampler slot to bind the coefficient table to the first sampler state;
receiving a first draw request;
accessing the first coefficient table based on the first pointer; and
performing a first draw with the first sampler state using the first set of texel weighting coefficients;
storing a second pointer to the third memory location in the first indirect sampler slot to bind the second coefficient table to the first sampler state;
receiving a second draw request;
accessing the second coefficient table based on the second pointer; and
performing a second draw with the first sampler state using the second set of texel weighting coefficients.

8. The method of claim 1, further comprising:
creating a first sampler state in the first memory location, the first sampler state specifying a sampler operable to weight a sampled texel value or plurality of texel values for each input texture address and to weight each sampled texel value with a predetermined weighting coefficient;
storing the reference to the first memory location in the first sampler slot to bind the first sampler state to the first sampler slot;
creating in the second memory location a coefficient table populated with the first set of texel weighting coefficients;
storing a pointer to the second memory location in the first indirect sampler slot to bind the coefficient table to the first sampler state;
receiving a first draw request;
accessing the coefficient table based on the pointer;
performing a first draw with the first sampler state using the first set of texel weighting coefficients;
modifying operation of a sampler operable in the first sampler state without updating the first sampler state by at least one of:
writing to the second memory location to generate a second set of texel weighting coefficients by replacing one or more coefficient within the first set of texel weighting coefficients; or
updating the pointer to reference a third memory location storing a second coefficient table populated with a different set of texel weighting coefficients;
receiving a second draw request;
accessing the coefficient table based on the pointer; and
performing a second draw with the first sampler state using the second set of texel weighting coefficients.

9. A dynamically programmable texture sampling system, the system comprising:
a memory;
first logic circuitry, comprising a graphical texture sampler hardware, or fixed function firmware, or a combination thereof, the first logic circuitry to:
store, in a first sampler slot of a binding table, a reference to a first memory location storing a first sampler state;
store, in a first indirect sampler slot of a binding table, a reference to a second memory location containing a first set of texel weighting coefficients; and
map the first sampler slot to the first indirect sampler slot to associate the first sampler state with the set of texel weighting coefficients; and
a display to display output images based at least in part on the performed mapping.

10. The system of claim 9, further comprising:
a texture sampler including sampler logic circuitry operable in the first sampler state to:
sample a plurality of texel values for each input texture address; and weight each sampled texel value with a predetermined weighting coefficient.

11. The system of claim 9, wherein:
the first sampler slot is one of a plurality of sampler slots in the binding table, and the plurality includes one sampler slot for each sampler state concurrently available to a shader;
the first indirect sampler slot is one of a plurality of indirect sampler slots in the binding table available to the shader, and the plurality of indirect sampler slots includes one indirect sampler slot for each direct sampler slot; and
the logic circuitry is to map each sampler slot to one of the indirect sampler slots.

12. The system of claim 9, wherein the logic circuitry is further to:
create the first sampler state in the first memory location, the first sampler state specifying a sampler operable to weight a sampled texel value or plurality of texel values for each input texture address and to weight each sampled texel value with a predetermined weighting coefficient;
store the reference to the first memory location in the first sampler slot to bind the first sampler state to the first sampler slot;
create in the second memory location a coefficient table populated with the first set of texel weighting coefficients; and
store a pointer to the second memory location in the first indirect sampler slot.

13. The system of claim 9, wherein the logic circuitry is further to:
create a flexible texture sampler state in the first memory location, the flexible sampler state specifying a sampler operable to sample a plurality of texel values for each input texture address and to weight each sampled texel value with a predetermined weighting coefficient;
store the reference to the first memory location in the first sampler slot to bind the flexible texture sampler to the first sampler slot;
create in the second memory location a first coefficient table populated with the first set of texel weighting coefficients;
store a pointer to the second memory location in the indirect sampler slot;
receive a draw request;
access the coefficient table based on the pointer; and
perform a draw with the flexible texture sampler state using the first set of texel weighting coefficients.

14. The system of claim 9, wherein the logic circuitry is further to:
create the first sampler state in the first memory location, the first sampler state specifying a sampler operable to weight a sampled texel value or plurality of texel values for each input texture address and to weight each sampled texel value with a predetermined weighting coefficient;
store the reference to the first memory location in the first sampler slot to bind the first sampler state to the first sampler slot;
create in the second memory location a first coefficient table populated with the first set of texel weighting coefficients;
store a pointer to the second memory location in the first indirect sampler slot; and
modify operation of a sampler operable in the first sampler state without updating the first sampler state by at least one of:

writing to the second memory location to generate a second set of texel weighting coefficients by replacing one or more coefficient within the first set of texel weighting coefficients; or
updating the pointer to reference a third memory location storing a second coefficient table populated with a different set of texel weighting coefficients.

15. One or more non-transitory computer readable media with instructions stored thereon, which when executed by a processor, cause the processor to perform a method of allocating filter weighting coefficients to a graphical texture sampler hardware, or fixed function firmware, or a combination thereof the method comprising:
providing a binding table with a first sampler slot to store a reference to a first memory location storing a first sampler state;
providing a binding table with a first indirect sampler slot to store a reference to a second memory location containing a first set of texel weighting coefficients;
mapping the first sampler slot to the first indirect sampler slot to associate the first sampler state with the set of texel weighting coefficients; and
display output images based at least in part on the performed mapping.

16. The media of claim 15, further comprising instructions to cause the processor to provide the binding tables, wherein:
the first sampler slot is one of a plurality of sampler slots, and the plurality includes one sampler slot for each sampler state concurrently available to a shader;
the first indirect sampler slot is one of a plurality of indirect sampler slots available to the shader, and the plurality of indirect sampler slots includes one indirect sampler slot for each direct sampler slot; and
each sampler slot is mapped to one of the indirect sampler slots.

17. The media of claim 15, further comprising instructions to cause the processor to perform the method further comprising:
creating the first sampler state in the first memory location, the first sampler state specifying a sampler operable to weight a sampled texel value or plurality of texel values for each input texture address and to weight each sampled texel value with a predetermined weighting coefficient;
storing the reference to the first memory location in the first sampler slot to bind the first sampler state to the first sampler slot;
creating in the second memory location a coefficient table populated with the first set of texel weighting coefficients; and
storing a pointer to the second memory location in the first indirect sampler slot.

18. The media of claim 15, further comprising instructions to cause the processor to perform the method further comprising:
creating a flexible texture sampler state in the first memory location, the flexible sampler state specifying a sampler operable to sample a plurality of texel values for each input texture address and to weight each sampled texel value with a predetermined weighting coefficient;
storing the reference to the first memory location in the first sampler slot to bind the flexible texture sampler to the first sampler slot;
creating in the second memory location a first coefficient table populated with the first set of texel weighting coefficients;

storing a pointer to the second memory location in the indirect sampler slot;
receiving a draw request;
accessing the coefficient table based on the pointer; and
performing a draw with the flexible texture sampler state using the first set of texel weighting coefficients.

19. The media of claim 15, further comprising instructions to cause the processor to perform the method further comprising:
creating the first sampler state in the first memory location, the first sampler state specifying a sampler operable to weight a sampled texel value or plurality of texel values for each input texture address and to weight each sampled texel value with a predetermined weighting coefficient;
storing the reference to the first memory location in the first sampler slot to bind the first sampler state to the first sampler slot;
creating in the second memory location a first coefficient table populated with the first set of texel weighting coefficients;
storing a pointer to the second memory location in the first indirect sampler slot; and
modifying operation of a sampler operable in the first sampler state without updating the first sampler state by at least one of:
writing to the second memory location to generate a second set of texel weighting coefficients by replacing one or more coefficient within the first set of texel weighting coefficients; or
updating the pointer to reference a third memory location storing a second coefficient table populated with a different set of texel weighting coefficients.

20. The media of claim 15, further comprising instructions to cause the processor to perform the method further comprising:
creating a first sampler state in the first memory location, the first sampler state specifying a sampler operable to weight a sampled texel value or plurality of texel values for each input texture address and to weight each sampled texel value with a predetermined weighting coefficient;
storing the reference to the first memory location in the first sampler slot to bind the first sampler state to the first sampler slot;
creating in the second memory location a first coefficient table populated with the first set of texel weighting coefficients;
creating in a third memory location a second coefficient table populated with a second set of texel weighting coefficients;
setting a sampler circuitry to operate in the first sampler state;
storing a first pointer to the second memory location in the first indirect sampler slot;
receiving a first draw request;
accessing the first coefficient table based on the first pointer; and
performing a first draw with the first sampler state using the first set of texel weighting coefficients;
storing a second pointer to the third memory location in the first indirect sampler slot to bind the second coefficient table to the first sampler state;
receiving a second draw request;
accessing the second coefficient table based on the second pointer; and
performing a second draw with the first sampler state using the second set of texel weighting coefficients.

21. The media of claim 15, further comprising instructions to cause the processor to perform the method further comprising:
creating a first sampler state in the first memory location, the first sampler state specifying a sampler operable to weight a sampled texel value with a predetermined weighting coefficient;
storing the reference to the first memory location in the first sampler slot to bind the first sampler state to the first sampler slot;
creating in the second memory location a coefficient table populated with the first set of texel weighting coefficients;
storing a pointer to the second memory location in the first indirect sampler slot;
receiving a first draw request;
accessing the coefficient table based on the pointer;
performing a first draw with the first sampler state using the first set of texel weighting coefficients;
modifying operation of a sampler operable in the first sampler state without updating the first sampler state by at least one of:
writing to the second memory location to generate a second set of texel weighting coefficients by replacing one or more coefficient within the first set of texel weighting coefficients; or
updating the pointer to reference a third memory location storing a second coefficient table populated with a different set of texel weighting coefficients;
receiving a second draw request;
accessing the coefficient table based on the pointer; and
performing a second draw with the first sampler state using the second set of texel weighting coefficients.

\* \* \* \* \*